(12) United States Patent
Anchondo (10) Patent No.: US 8,074,405 B1
(45) Date of Patent: Dec. 13, 2011

(54) RAIN COLLECTING WALL SYSTEM

(76) Inventor: Todd Anchondo, Tucson, AZ (US)

( * ) Notice: Subject to any disclaimer, the term of this patent is extended or adjusted under 35 U.S.C. 154(b) by 0 days.

(21) Appl. No.: 12/729,699

(22) Filed: Mar. 23, 2010

Related U.S. Application Data (60) Provisional application No. 61/210,894, filed on Mar. 24, 2009.

(51) Int. Cl.
*E04B 1/92* (2006.01)
(52) U.S. Cl. .................. 52/168; 52/302.1; 405/284
(58) Field of Classification Search .............. 52/168, 52/302.1, 302.3, 302.4, 592.1, 578, 582.1; 256/24; 405/110, 111
See application file for complete search history.

(56) References Cited

U.S. PATENT DOCUMENTS

| | | | | |
|---|---|---|---|---|
| 4,773,629 A | * | 9/1988 | Yodock | 256/13.1 |
| 4,910,931 A | * | 3/1990 | Pardue, Jr. | 52/169.5 |
| 5,730,179 A | * | 3/1998 | Taylor | 137/357 |
| 5,833,332 A | * | 11/1998 | Marshall et al. | 312/223.3 |
| 5,852,906 A | * | 12/1998 | Kuban | 52/302.1 |
| 6,059,491 A | * | 5/2000 | Striefel et al. | 405/111 |
| 6,324,782 B1 | * | 12/2001 | Gaston | 47/33 |
| 6,966,333 B1 | * | 11/2005 | Kuehneman | 137/357 |
| 7,603,823 B2 | | 10/2009 | Cann | |
| 2003/0046888 A1 | * | 3/2003 | Ryan | 52/302.1 |
| 2006/0150531 A1 | | 7/2006 | Cann | |
| 2009/0039087 A1 | | 2/2009 | Dominguez | |

FOREIGN PATENT DOCUMENTS

WO        9311310 A1    6/1993

OTHER PUBLICATIONS

WWW.RAINWATERHOG.COM; modular water storage; internet; Jul. 19, 2011.

* cited by examiner

*Primary Examiner* — Brian E Glessner
*Assistant Examiner* — Gisele Ford (57) ABSTRACT

A rain collecting wall system comprising a plurality of interlocking wall components each with a chamber for storing water; sets of teeth disposed on either side of the wall components, the sets of teeth allow the wall components to be arranged to form a structure wherein the first set of teeth of a first wall component engages the second set of teeth of a second wall component; an aperture disposed in each set of teeth adapted to receive an anchor for supporting the wall component in an upright position; structural supports for helping the wall components resist bowing; at least one water access point disposed; and a mounting system for attaching building materials or shelving systems to the wall components.

16 Claims, 6 Drawing Sheets

RAIN COLLECTING WALL SYSTEM

CROSS REFERENCE

This application claims priority to U.S. provisional application Ser. No. 61/210,894 filed Mar. 24, 2009, the specification of which is incorporated herein by reference in its entirety.

FIELD OF THE INVENTION

The present invention is directed to a wall system, more particularly to a wall system for collecting rainwater to save for later use.

BACKGROUND OF THE INVENTION

Collecting rainwater and saving it for a time of need can help save an individual money as well as help conserve valuable water resources. Some individuals place large bins throughout their yards for collecting rainwater. However, these bins can be cumbersome and unsightly. Some rainwater collecting devices are not freestanding and require that they be mounted to walls of houses or already existing garages and sheds. The present invention features a rain collecting wall system for collecting rainwater to be saved for later use. The system of the present invention can be used for creating an aesthetically appealing structure, for example a yard enclosure, a garage, a shed, and/or the like.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Referring now to FIGS. 1-6, the present invention features a rain collecting wall system 100 for collecting water (e.g., rainwater) to be saved for later use. The system 100 of the present invention is not limited to collecting water such as rainwater. In some embodiments, the present invention is used to collect water from a tap, or in some embodiments, the system 100 of the present invention is used to collect other liquid or solid materials, for example beverages and/or foods.

The system 100 of the present invention comprises a plurality of interlocking wall components 110 that can be arranged to form a structure, for example a backyard wall, a landscape barrier, a garden nook, a greenhouse, an irrigation center, and the like. For example, the system 100 of the present invention can create a garden nook (e.g., 6 feet by 6 feet), which can provide a focal point in a garden or yard while providing water and shade in a small space (e.g., an awning may be incorporated with the system 100). The garden nook, for example, may function to store about 300 gallons of water. In some embodiments, the system 100 is used to crate a shed (e.g., 12 feet by 12 feet), which can be sued to store yard tools and/or other supplies. The shed, for example, may function to store over about 1,000 gallons of water. In some embodiments, the system 100 is used to create a yard wall for enclosing a yard (e.g., 36 feet by 48 feet) or a patio wall around a patio, which can provide privacy to a home. In some embodiments, the yard wall can store about 3,500 gallons of water. The system 100 may be used to create a greenhouse, wherein water for the greenhouse can be obtained from the wall components 110 of the system 100. In some embodiments, the system 100 of the present invention is used for subfloor heating, building structures such as garages or sheds, or for creating thermal mass walls. The present invention is not limited to the aforementioned structures and/or uses.

Accessories may be used in combination with the system 100 of the present invention, for example lighting options and/or various coverings (e.g., coverings of the wall components and/or awnings, etc).

The system 100 of the present invention comprises a plurality of interlocking wall components 110. The wall components 110 generally have a first side, a second side, a front surface, a back surface, a bottom surface, and a top surface. Generally, the wall components 110 are free standing. Disposed in the wall components 110 are is a chamber (e.g., water tank) for storing water. In some embodiments, one or more chambers (e.g., water tanks) are disposed in the wall components 110.

The wall components 110 of the present invention may be constructed in a variety of sizes. For example in some embodiments, the wall component 110 is between about 4 to 6 feet in length as measured from the first side to the second side. In some embodiments, the wall component 110 is between about 6 to 8 feet in length as measured from the first side to the second side. In some embodiments, the wall component 110 is between about 4 to 6 feet in height as measured from the bottom surface to the top surface. In some embodiments, the wall component 110 is between about 6 to 8 feet in height as measured from the bottom surface to the top surface. In some embodiments, the wall component 110 is between about 6 to 12 inches (e.g., 8 inches) in thickness as measured from the front surface to the back surface.

In some embodiments, the chamber of the wall component 110 can hold between about 100 to 150 gallons of water. In some embodiments, the chamber of the wall component 110 can hold between about 150 to 200 gallons of water. In some embodiments, the chamber of the wall component 110 can hold between about 200 to 250 gallons of water. In some embodiments, the chamber of the wall component 110 can hold between about 250 to 300 gallons of water. The present invention is not limited to the aforementioned examples of sizes.

The wall components 110 of the present invention may be constructed from a variety of materials (e.g., water-impermeable materials). For example, the wall components 110 may be constructed from a material including but not limited to a material comprising plastic, metal, wood, the like, or a combination thereof. The wall components 110 may be constructed to allow for coating or adhesion of building materials such as stucco, concrete, brick, wood, the like, or a combination thereof. In some embodiments, a mounting system (e.g., mounting bars 410, see below) is used to attach such building materials (e.g., a fence, etc.) to the wall components 110.

Figure 1:
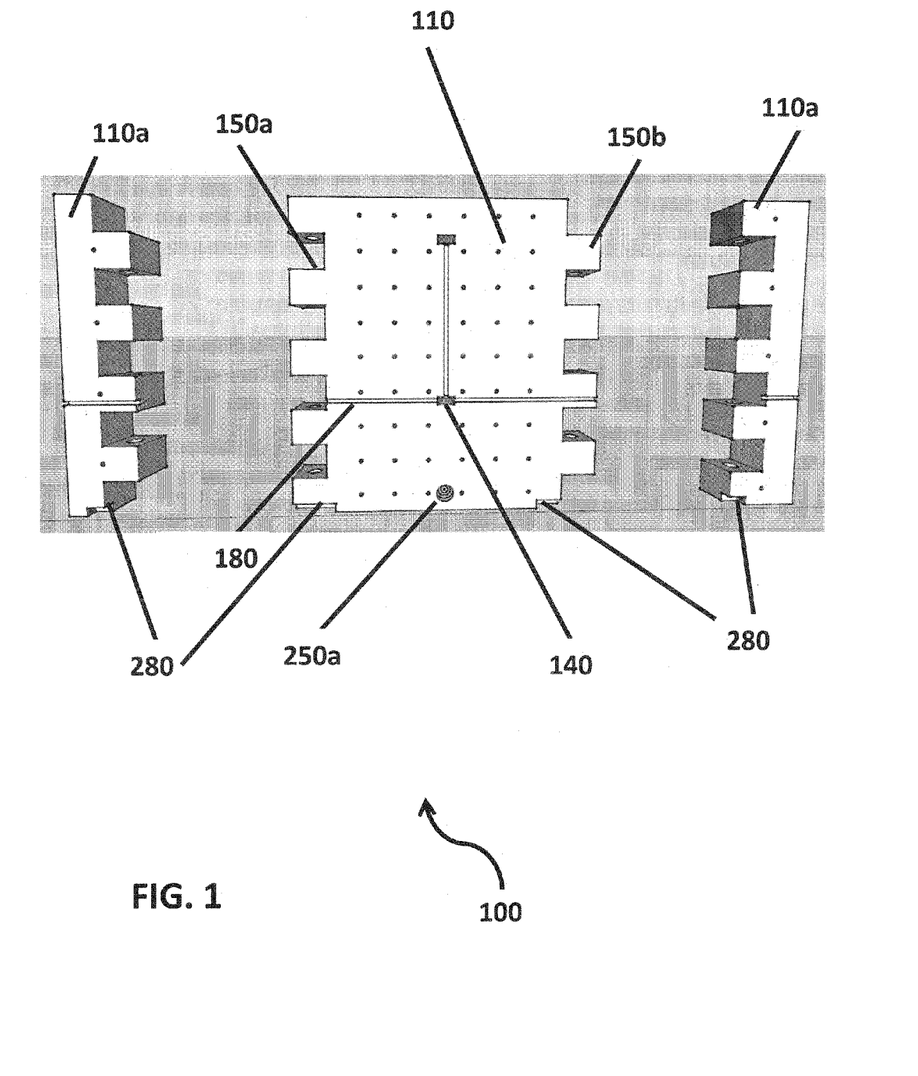
FIG. 1 is a front view of a wall component of the system of the present invention.

As shown in FIG. 1, a first set of teeth 150a is disposed in the first side of the wall component 110 and a second set of teeth 150b is disposed in the second side of the wall component 110. The teeth of the sets 150a, 150b are arranged such that the first side wall of a first wall component can be interlocked with a second side wall of a second wall component. A plurality of wall components can be interlocked (via the sets of teeth) to create various structures. In some embodiments, the teeth of the sets 150a, 150b allow integration of other materials such as cinder blocks, wood, brick, etc. In some embodiments, the wall component 110 has only one set of teeth (e.g., a first set of teeth) and is used as an "end piece" for a wall (see 110a in FIG. 1). The teeth may also provide structural support to the wall components 110.

Figure 2:
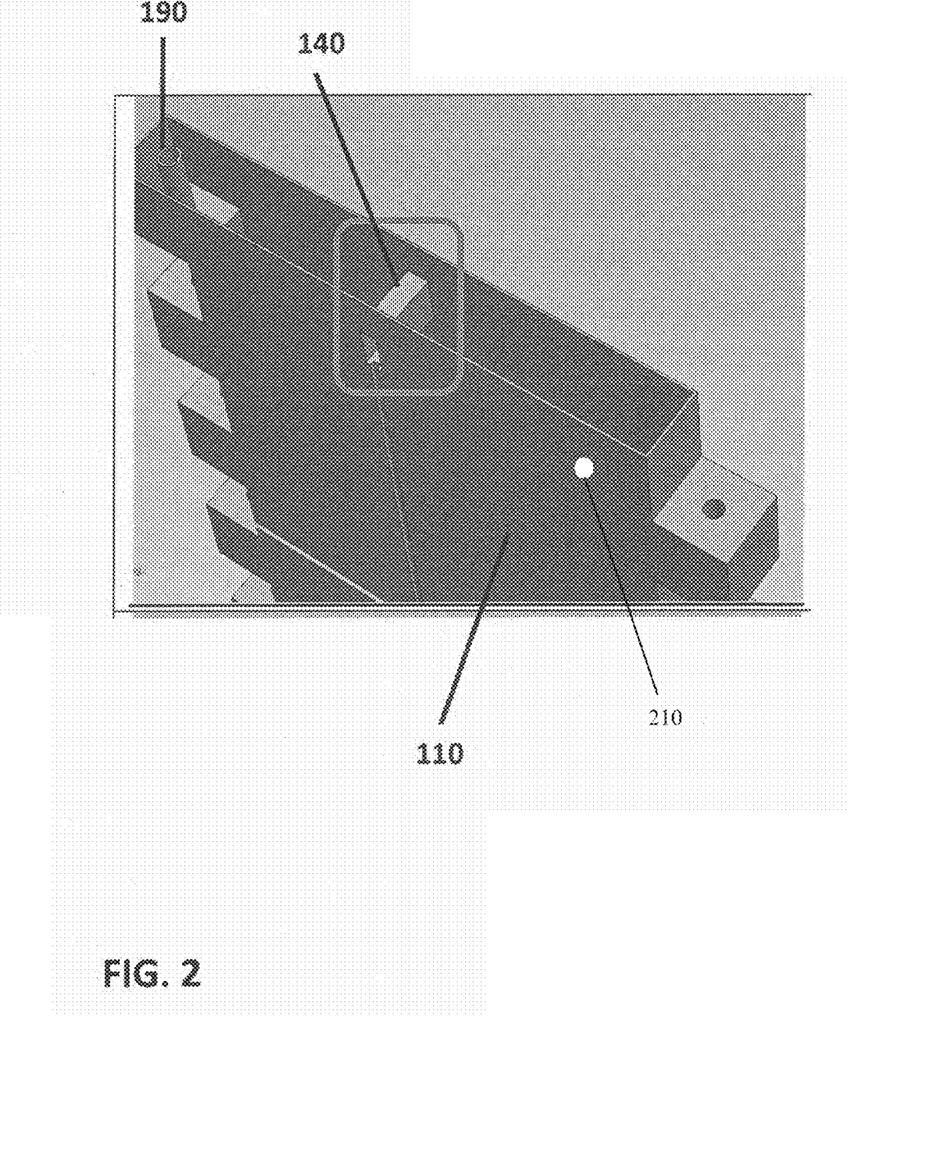
FIG. 2 is a top perspective view of the wall component of FIG. 1.

In some embodiments, one or more structural supports 140 are disposed in the wall component 110 (e.g., going through the chamber, spanning from the front surface of the wall component 110 to the back surface). The structural supports 140 may be, for example, channels spanning from the front surface of the wall component 110 to the back surface. The structural supports 140 may the wall component 110 resist bowing due to the pressure of the water in the chamber(s) of the wall component 110. In some embodiments, the structural support 140 is capable of housing a number of devices, for example electrical devices, utilities devices, decorative devices, and the like. The structural support can vary in size, shape, and location. FIG. 1 shows two structural supports 140 disposed in a wall component 110. FIG. 2 shows the structural support 140 spanning from the front surface to the back surface of the wall component 110.

Figure 3:
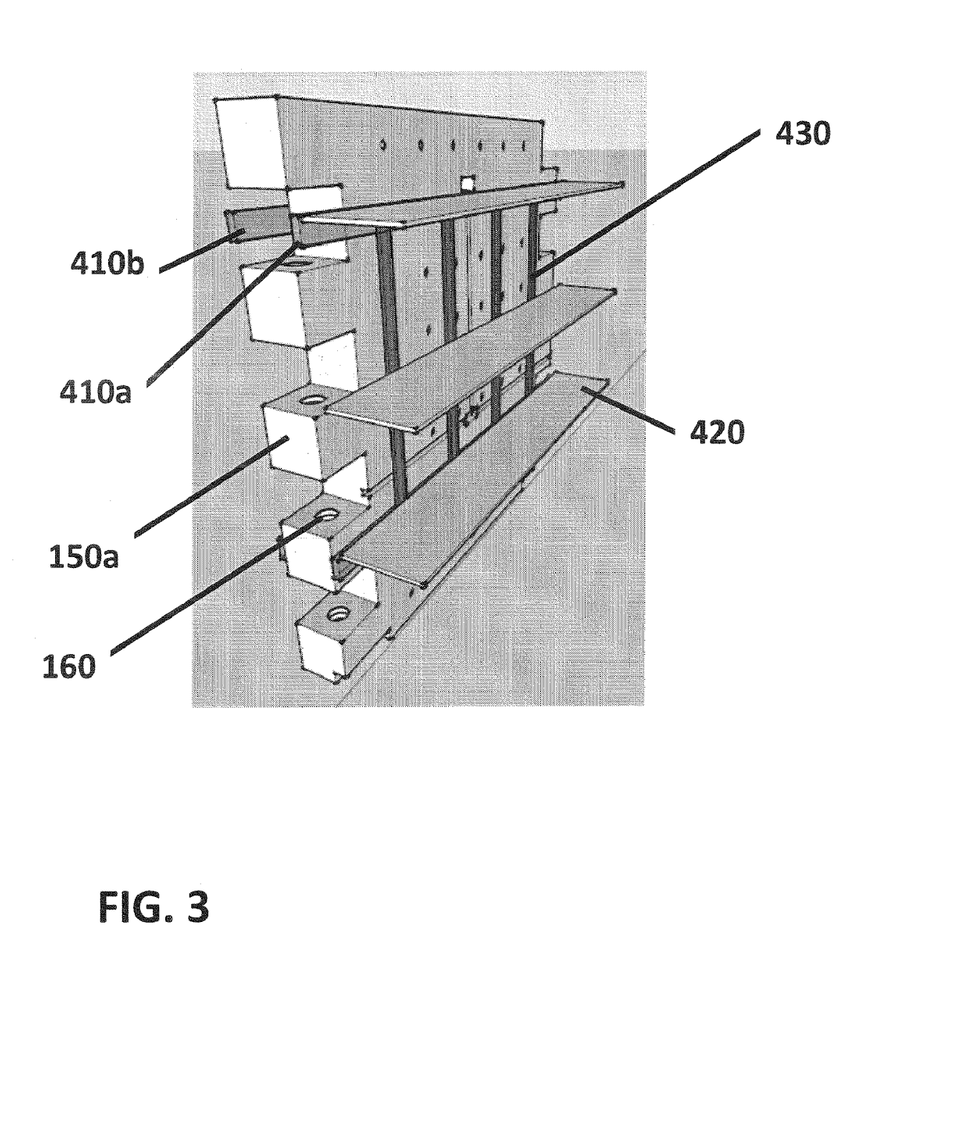
FIG. 3 is a side perspective view of a wall component of the system of the present invention, wherein a first mounting bar and a second mounting bar are attached to the wall component. The mounting bars support a shelf system.

In some embodiments, apertures 160 are disposed in the teeth of sets 150a, 150b (see FIG. 3). The apertures 160 may function to help deliver water to other chamber(s) of other wall component 110. In some embodiments, the apertures 160 are used for receiving a stake, anchor 190, or pole, for example to provide stability to the wall component 110. For example, either a free standing wall component 110 or interlocking wall components 110 can be secured by inserting a stake, pole, or anchor 190 through the apertures 160 and further into a ground surface, for example. FIG. 2 shows an example of an anchor 190 threaded through the apertures in the first set of teeth 150a. Generally, the stake, anchor 190, or pole does not affect water containment. In some embodiments, the anchors 190 provide a means of attaching roofs, covers, sun shades, and the like to the wall component 110. In some embodiments, the apertures 160 may function to help deliver water collected to a particular location. In some embodiments, the apertures 160 can be sealed, for example if the wall component 110 is used alone (e.g., with no end pieces), to help prevent water from leaking from the apertures 160.

In some embodiments, channels 180 are disposed in the wall component 110. The channels 180 may connect (e.g., fluidly connect) the structural supports 140. The channels 180 may allow for electrical devices, utilities devices, and decorative devices to be run to the structural supports in a single wall section or between wall sections. The channels 180 may also function as a decorative design.

Figure 5:
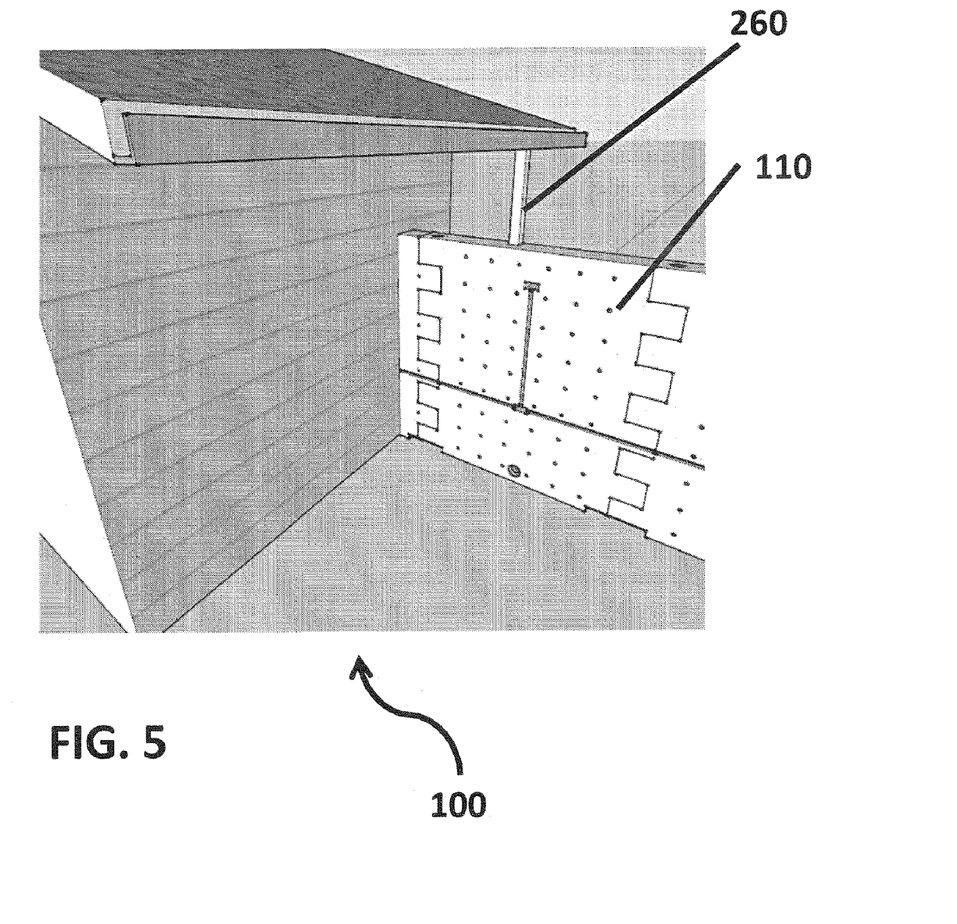
FIG. 5 is a perspective view of the wall component of the system of the present invention fluidly connected to a gutter system via a pipe.
Figure 6:
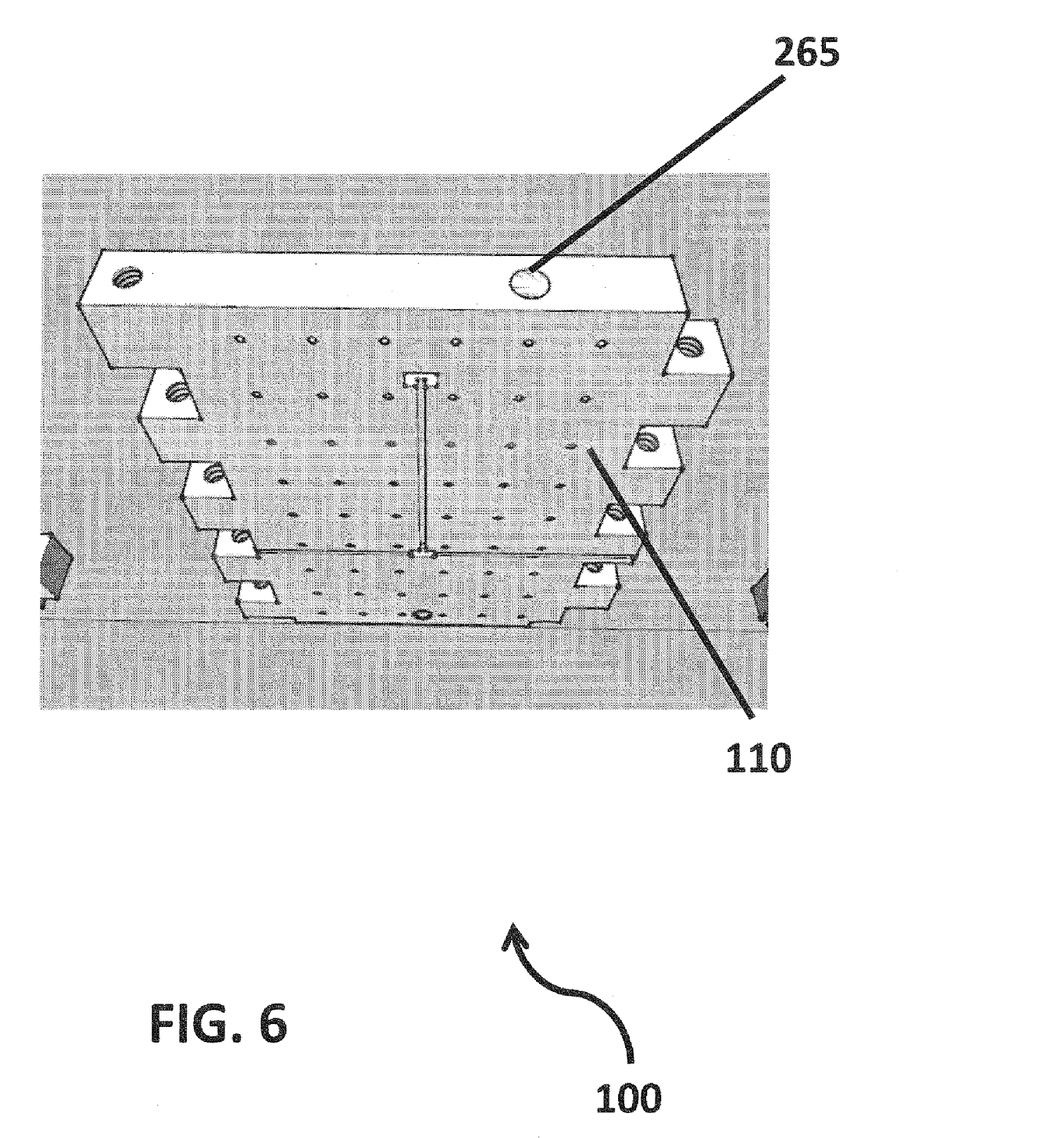
FIG. 6 is a top perspective view of the wall component system of the present invention.

In some embodiments, the chamber(s) are filled with water via a gravity mechanism or a pump mechanism (e.g., external pump). Referring now to FIG. 5, the system 100 may comprise a pipe 260 that extends upwardly from a water aperture 265 disposed in the wall component 110 (e.g., in the top surface of the wall component 110). In some embodiments, the pipe 260 fluidly connected to a gutter system, for example as shown in FIG. 5. The pipe 260 functions to collect water from the gutter system and deliver the water into the chamber(s) of the wall components 110. In some embodiments, an external pump is fluidly connected to the water aperture 265 or the pipe 260, wherein the external pump functions to pump water into the chambers of the wall component 110 via the water aperture. The present invention is not limited to a water aperture 265 disposed in the top surface of the wall component 110 as shown in FIG. 6. For example, the water aperture 265 may be disposed in a side wall, the front surface, or the back surface of the wall component 110. In some embodiments, water is collected without the pipe 260. In some embodiments, a funnel system is fluidly connected to the water aperture 265.

In some embodiments, water that is collected may connect to a subterranean pump that connects to the wall component (e.g., the chamber).

The wall components 110 each comprise at least one access point 250 for obtaining the water stored in the chamber(s) of the wall components 110. As shown in FIG. 1, a first access point 250a may be disposed in the wall component 110 near the bottom surface. The access points 250 may comprise a valve or a spigot for regulating the collection of water from the access point 250. Some access points may be used for periodic cleaning and/or for maintenance (e.g., maintenance of electric wires, etc.). In some embodiments, the access points 250 are used for fluidly connecting pumps, which can be used to collect water from the wall component 110 or to pump water into the wall component 110.

In some embodiments, each chamber has an electrical housing for storing electrical conduits that may provide electricity for lights, monitoring systems, pumps, the like, or a combination thereof. For example, in some embodiments, the wall components 110 may house low voltage electrical wiring (e.g. for providing power for lighting systems, irrigation (e.g., pumps), timers, etc.) In some embodiments, a user may wish to add accent patio lighting around the yard, provide light in a shed for finding tools, run a timer, run an irrigation system for a specific area.

In some embodiments, connectors between the wall components 110 allow rainwater to fill the chambers of the respective wall components 110 evenly so that no chamber (wall component 110) is filled up completely before another. For example, in some embodiments, the wall components 110 comprise an interlocking structure, wherein a connecting pipe is disposed at the bottom of the interlocking structure, which allows each chamber in the wall components 110 to be filled up simultaneously. This connecting pipe (e.g., opening) may be large enough to ensure that no chamber is completely filled before any other. There may be multiple openings going up the sides of each wall component 110 so there is no risk of a single tank being filled up faster than others. If the chambers are connected together (in series, for example), one water aperture may be sufficient for collecting water. Referring now to FIG. 1, connecting apertures 280 may be disposed in the wall components 110, for example at the bottom of the sets of teeth. The connecting apertures 280 may be used to connect the chambers of the wall components 110 together in series.

In some embodiments, the connecting apertures 280 are used to access and obtain the collected water in the chambers of the wall components 110.

In some embodiments, one or more vents 210 are disposed in the wall component 110, for example in the chambers. The vents can help prevent a vacuum from forming inside the chambers.

In some embodiments, the wall components 110 are constructed to be durable, for example to resist and/or restrict bowing. In some embodiments, the wall components 110 are constructed from a material comprising polyethylene. In some embodiments, the system 100 comprises a filter for helping to prevent particle matter from entering the chambers. In some embodiments, the system 100 comprises a pump with a discharge means, which can transfer water from a source into a chamber or to distribute water between chambers of adjacent wall components 110.

The system 100 of the present invention comprises a mounting system for incorporating various materials to help make the wall components 110 look aesthetically pleasing. The mounting system may allow for attachment of building materials including but not limited to fencing (see FIG. 4) such as wood fencing, siding, bricks, stucco, the like, or a combination thereof. In some embodiments, the mounting system helps attach material to the wall component 110 such that the wall component 110 matches or blends in with the color and texture of a home or other surrounding structure. The mounting system may allow for attachment of shelves 420 (see FIG. 3). The mounting system is not limited to the aforementioned applications. In some embodiments, the mounting system is used for attaching such materials (e.g., building materials, shelving 420, etc.) to other water holding tanks.

Figure 4:
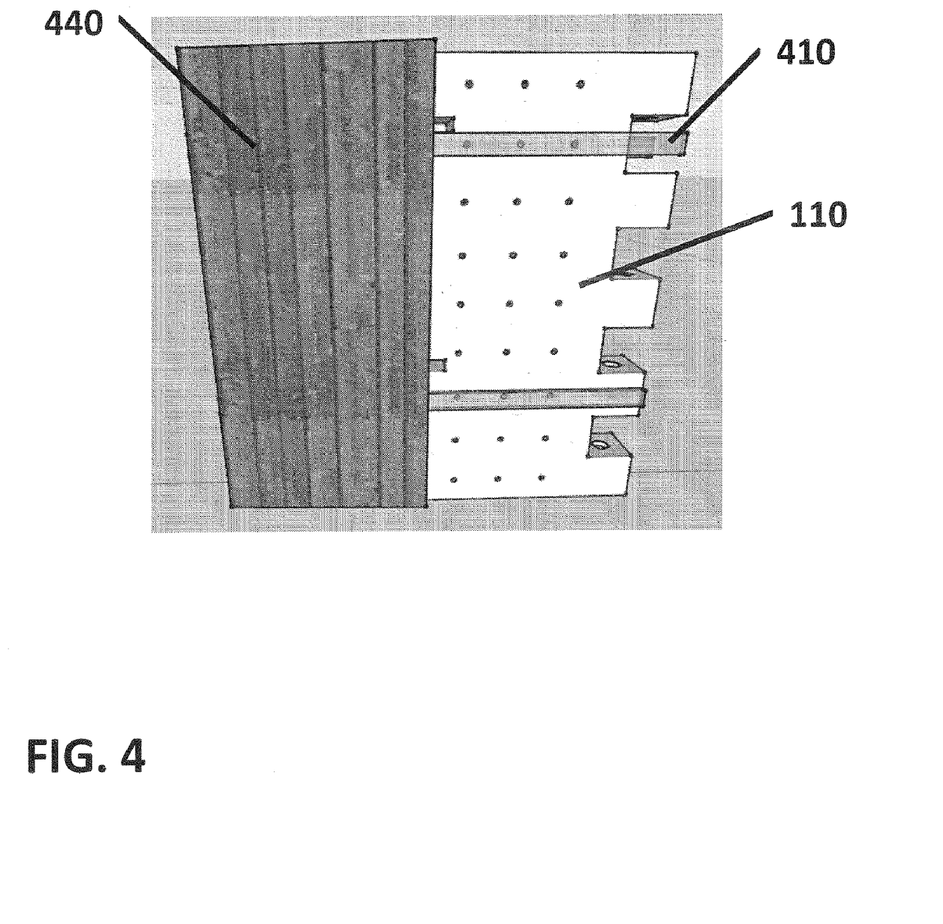
FIG. 4 is a front view of a wall component of the system of the present invention, wherein mounting bars support attachment of a fence.

In some embodiments, the mounting system comprises a first mounting bar 410a attachable to the wall component 110 via an attachment means (e.g., a snap mechanism, a latch mechanism, a clamp mechanism, a bolt mechanism, an adhesive mechanism, a magnet mechanism, a combination thereof, etc.). The mounting system may comprise more than one mounting bar, for example a first mounting bar 410a and a second mounting bar 410b (a third mounting bar, a fourth mounting bar, etc.). In some embodiments, the attachment means allows attachment of a first mounting bar 410a on the front surface of the wall component 110 and a second mounting bar 410b on the back surface of the wall component 110 (see FIG. 3). The mounting bars may be attached to the wall component 110 via the structural supports 140 (e.g., in combination with the attachment means), or via other openings in the wall component 110 or channels 180. FIG. 3 shows the mounting bars 410 providing a means of attaching shelving 420 to the wall component 110. Also shown in FIG. 3 is a plurality of shelf support bars 430, which connect the shelves 420 to the mounting bars 410. FIG. 4 shows the mounting bars 410 providing a means of attaching a fence 440 the wall component 110.

Without wishing to limit the present invention to any theory or mechanism, it is believed that the system 100 of the present invention is advantageous because it can help provide a means of harvesting water while minimizing space lost in a yard. And, the mounting system of the system 100 of the present invention may help overcome the barrier of Home Owners Association (HOA) restrictions. A majority of HOAs prohibit rainwater harvesting due to the tanks being visible from the street and the tanks being an eyesore. In order for many residents to harvest rainwater, a wall must be built around tanks to avoid them being visible from the street. The additional steps of building such walls can be prohibitive to homeowners due to increases in project time and costs. In some embodiments, the mounting system allows coverings to be attached to the wall components 110 which may help extend the life of the tank by protecting it from sun exposure.

The present invention also features kits comprising the system 100 of the present invention. For example, a kit may comprise a plurality of wall components 110 and one or more of the following: end pieces 110a, anchors 190, pipes 260, spigots, tank connection plugs, filters (e.g., leaf screener, mounting bars 410, attachment means, shelving 420, lighting systems, awnings or coverings, building materials (e.g., wood, siding, fencing, stucco, etc.), other accessories, the like, or a combination thereof.

The present invention also features methods for storing water. The method comprises obtaining the system 100 of the present invention. The method may further comprise flowing water from a source into a chamber of a wall component and storing the water for a predetermined amount of time. In some embodiments, the water is pumped into the chamber. In some embodiments, the water flows into the chamber via gravitational force.

As used herein, the term "about" refers to plus or minus 10% of the referenced number. For example, an embodiment wherein the wall component 110 is about 6 feet in height includes a wall component 110 that is between 5.4 and 6.6 feet in height.

The following the disclosures of the following patents are incorporated in their entirety by reference herein: U.S. Pat. No. 7,603,823; U.S. Pat. Application No. 2006/0150531; W.O. Pat. No. 1993/011310.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A rain collecting wall system comprising:
   (a) a plurality of interlocking wall components, each having a first side, a second side, a front surface, a back surface, a bottom surface, and a top surface;
   (b) a chamber disposed inside each wall component, the chamber functions to store water;
   (c) a first set of teeth disposed in the first side of each wall component and a second set of teeth disposed in the second side of each wall component, the sets of teeth allow the wall components to be arranged to form a structure wherein the first set of teeth of a first wall component engages the second set of teeth of a second wall component;
   an aperture disposed in each of the first set of teeth and the second set of teeth, the apertures receive an anchor, the anchor being driven into a ground surface to support the wall component in an upright position;
   (e) a structural support disposed in each wall component, the structural support traverses a chamber disposed in the respective wall component, wherein the structural support functions to help the respective wall component resist bowing due to the pressure of the water in the chambers;

(f) a water aperture disposed in each wall component, the water aperture fluidly connects to the chamber of the respective wall component so as to deliver water to the chamber;
(g) at least one water access point disposed in each wall component, the access point allows a user to obtain the water from the chambers in the respective wall components; and
(h) at least one channel disposed in each wall component that fluidly connects the structural supports.

2. The system of claim 1, wherein the wall components can each hold between about 100 to 200 gallons of water.

3. The system of claim 1, wherein the wall components can each hold between about 200 to 300 gallons of water.

4. The system of claim 1, wherein the wall components are constructed to allow for coating of stucco, concrete, or brick.

5. The system of claim 1, wherein the structural support functions to house electrical devices, utilities devices, or decorative devices.

6. The system of claim 1 further comprising one or more vents disposed in the wall component to prevent a vacuum from forming inside the chambers.

7. The system of claim 1 further comprising a pipe that extends upwardly from the water aperture disposed in the wall component, the pipe functions to collect water from a gutter system and deliver the water to the chambers of the wall components.

8. The system of claim 1, wherein the access points each comprise a valve or a spigot for regulating collection of water from the access point.

9. A rain collecting wall system comprising:
(a) a plurality of interlocking wall components, each having a first side, a second side, a front surface, a back surface, a bottom surface, and a top surface;
(b) a chamber disposed inside each wall component, the chamber functions to store water;
(c) a first set of teeth disposed in the first side of each wall component and a second set of teeth disposed in the second side of each wall component, the sets of teeth allow the wall components to be arranged to form a structure wherein the first set of teeth of a first wall component engages the second set of teeth of a second wall component;
an aperture disposed in each of the first set of teeth and the second set of teeth, the apertures receive an anchor, the anchor being driven into a ground surface to support the wall component in an upright position;
(e) a structural support disposed in each wall component, the structural support traverses a chamber disposed in the respective wall component, wherein the structural support functions to help the respective wall component resist bowing due to the pressure of the water in the chambers;
(f) a water aperture disposed in each wall component, the water aperture fluidly connects to the chamber of the respective wall component so as to deliver water to the chamber;
(g) at least one water access point disposed in each wall component, the access point allows a user to obtain the water from the chambers in the respective wall components;
(h) at least one channel disposed in each wall component that fluidly connects the structural supports; and
(i) a mounting system attachable to each wall component via an attachment means, the mounting system functions to allow attachment of a building material or a shelf system.

10. The system of claim 9, wherein the mounting system comprises a mounting bar.

11. The system of claim 9, wherein the building material is a fence, a siding, a stucco, a brick, a wood, or a combination thereof.

12. The system of claim 9 further comprising one or more vents disposed in the wall component to prevent a vacuum from forming inside the chambers.

13. The system of claim 9 further comprising a pipe that extends upwardly from the water aperture disposed in the wall component, the pipe functions to collect water from a gutter system and deliver the water to the chambers of the wall components.

14. The system of claim 9, wherein the access points each comprise a valve or a spigot for regulating collection of water from the access point.

15. A kit comprising:
(a) a rain collecting wall system comprising:
(i) a plurality of interlocking wall components, each having a first side, a second side, a front surface, a back surface, a bottom surface, and a top surface;
(ii) a chamber disposed inside each wall component, the chamber functions to store water;
(iii) a first set of teeth disposed in the first side of each wall component and a second set of teeth disposed in the second side of each wall component, the sets of teeth allow the wall components to be arranged to form a structure wherein the first set of teeth of a first wall component engages the second set of teeth of a second wall component;
an aperture disposed in each of the first set of teeth and the second set of teeth, the apertures receive an anchor, the anchor being driven into a ground surface to support the wall component in an upright position;
(v) a structural support disposed in each wall component, the structural support traverses a chamber disposed in the respective wall component, wherein the structural support functions to help the respective wall component resist bowing due to the pressure of the water in the chambers;
(vi) a water aperture disposed in each wail component, the water aperture fluidly connects to the chamber of the respective wall component so as to deliver water to the chamber;
(vii) at least one water access point disposed in each wall component, the access point allows a user to obtain the water from the chambers in the respective wall components;
(viii) at least one channel disposed in each wall component that fluidly connects the structural supports; and
(b) a mounting system attachable to each wall component via an attachment means, the mounting system functions to allow attachment of a building material or a shelf system;
(c) a spigot; and
(d) at least one anchor.

16. The kit of claim 15 further comprising a pipe that extends upwardly from the water aperture disposed in the wall component, the pipe functions to collect water from a gutter system and deliver the water to the chambers of the wall components.

* * * * *